United States Patent
Zhang et al.

(10) Patent No.: US 10,841,948 B2
(45) Date of Patent: Nov. 17, 2020

(54) METHODS TO SUPPORT UL TRANSMISSION ON MULTIPLE NUMEROLOGIES IN NR SYSTEM

(71) Applicant: MEDIATEK SINGAPORE PTE. LTD., Singapore (SG)

(72) Inventors: Yuanyuan Zhang, Beijing (CN); Chia-Chun Hsu, Hsinchu (TW); Pavan Santhana Krishna Nuggehalli, San Jose, CA (US); Tao Chen, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/310,249

(22) PCT Filed: Dec. 26, 2017

(86) PCT No.: PCT/CN2017/118451
§ 371 (c)(1),
(2) Date: Dec. 14, 2018

(87) PCT Pub. No.: WO2018/121495
PCT Pub. Date: Jul. 5, 2018

(65) Prior Publication Data
US 2019/0313438 A1    Oct. 10, 2019

(30) Foreign Application Priority Data
Dec. 28, 2016  (WO) ................ PCT/CN2016/112649

(51) Int. Cl.
*H04W 4/00* (2018.01)
*H04W 72/14* (2009.01)
(Continued)

(52) U.S. Cl.
CPC .......... *H04W 72/14* (2013.01); *H04L 1/1819* (2013.01); *H04L 1/1829* (2013.01);
(Continued)

(58) Field of Classification Search
USPC ................................. 370/329, 312
See application file for complete search history.

(56) References Cited

U.S. PATENT DOCUMENTS

2016/0294498 A1   10/2016   Ma et al.
2016/0352551 A1   12/2016   Zhang et al.
(Continued)

FOREIGN PATENT DOCUMENTS

| | | |
|---|---|---|
| CN | 101335731 A | 12/2002 |
| EP | 2 244 514 A1 | 10/2010 |
| WO | WO 2016/130175 A1 | 8/2016 |

OTHER PUBLICATIONS

International Search Report and Written Opinion of the International Searching Authority dated Mar. 26, 2018 in PCT/CN2017/18451 filed Dec. 26, 2017.
(Continued)

*Primary Examiner* — Phuongchau Ba Nguyen
(74) *Attorney, Agent, or Firm* — Oblon, McClelland, Maier & Neustadt, L.L.P.

(57) ABSTRACT

Aspects of the disclosure provide a method for transmission with multiple numerologies in a wireless communication network. The method can include associating logical channels each with a first numerology indicating an allowed subcarrier spacing for transmission of data units in the respective logical channel, and multiplexing data units of a subset of the logical channels into a transport block associated with a second numerology, the subset of the logical channels each having a first numerology that is the same as the second numerology.

20 Claims, 6 Drawing Sheets

(51) Int. Cl.
    *H04W 76/27*    (2018.01)
    *H04L 1/18*     (2006.01)
    *H04L 5/00*     (2006.01)
    *H04W 88/02*    (2009.01)

(52) U.S. Cl.
    CPC .......... *H04L 5/0053* (2013.01); *H04L 5/0091* (2013.01); *H04L 5/0094* (2013.01); *H04W 76/27* (2018.02); *H04W 88/02* (2013.01); *H04L 5/001* (2013.01)

(56) References Cited

U.S. PATENT DOCUMENTS

| | | | |
|---|---|---|---|
| 2018/0007673 A1 | 1/2018 | Fwu et al. | |
| 2019/0132857 A1* | 5/2019 | Babaei | H04W 72/1273 |
| 2019/0313438 A1* | 10/2019 | Zhang | H04L 1/1819 |

OTHER PUBLICATIONS

Combined Taiwanese Office Action and Search Report dated Nov. 22, 2018 in Taiwanese Patent Application No. 106145986, 6 pages.

\* cited by examiner

| SUBCARRIER SPACING | 15 KHz | 30 KHz | 60 KHz | 120 KHz | 240 KHz | 480 KHz |
|---|---|---|---|---|---|---|
| OFDM SYMBOL DURATION (μS) | 66.67 | 33.33 | 16.67 | 8.33 | 4.17 | 2.08 |
| CP LENGTH (NS) | 4687 | 2344 | 1172 | 586 | 293 | 146 |
| ... | | | | | | |
| NUMEROLOGY INDEX | INDEX 1 | INDEX 2 | INDEX 3 | INDEX 4 | INDEX 5 | INDEX 6 |

METHODS TO SUPPORT UL TRANSMISSION ON MULTIPLE NUMEROLOGIES IN NR SYSTEM

CROSS REFERENCE TO RELATED APPLICATIONS

This present disclosure claims the benefit of International Application No. PCT/CN2016/112649, "Methods to Support UL Transmission on Multiple Numerologies in NR System" filed on Dec. 28, 2016, which is incorporated herein by reference in its entirety.

FIELD OF INVENTION

The present disclosure relates to wireless communications, and particularly relates to transmission processing with scalable subcarrier spacing in a New Radio system.

BACKGROUND OF THE INVENTION

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The 5G New Radio (NR) system is designed to operate from sub-1 GHz to 100 GHz for a wide range of deployment options and to support a variety of services. A single waveform numerology is difficult to satisfy all these requirements. Scalable orthogonal frequency division multiplex (OFDM) numerology with scaling of subcarrier spacing is adopted in NR.

SUMMARY OF THE INVENTION

Aspects of the disclosure provide a method for transmission with multiple numerologies in a wireless communication network. The method can include associating logical channels each with a first numerology indicating an allowed subcarrier spacing for transmission of data units in the respective logical channel, and multiplexing data units of a subset of the logical channels into a transport block associated with a second numerology, the subset of the logical channels each having a first numerology that is the same as the second numerology.

In an embodiment, the method can further include receiving an uplink resource grant corresponding to the transport block and indicating transmission resources on a bandwidth part. In one example, the resource grant includes an indicator indicating the second numerology. In one example, a numerology configured for the bandwidth part is determined to be the second numerology associated with the transport block. In one example, the second numerology associated with the transport block is derived according to a semi-persistent uplink transmission resource scheduling configuration. The semi-persistent uplink transmission resource scheduling configuration specifies blocks of uplink transmission resources on one or more bandwidth parts each configured with a numerology.

In an embodiment, the method can further include receiving numerology configurations of a component carrier that is partitioned into multiple bandwidth parts each configured with a numerology. The transport block corresponds to a block of uplink transmission resources carried in one of the multiple bandwidth parts that is configured with the second numerology.

In one example, the first numerology associated with the logical channels or the second numerology associated with the transport block are each identified by a numerology index. In one example, an association between a first or second numerology and a numerology index is specified in a communication standard, or configured by system information or a radio resource control (RRC) message received from a base station.

In one example, the method can further include transmitting the transport block with a hybrid automatic repeat request (HARQ) entity that is one of multiple HARQ entities each corresponding to a bandwidth part of a component carrier. In one example, the method can further include transmitting the transport block with a hybrid automatic repeat request (HARQ) entity operating on multiple bandwidth parts of a component carrier.

Aspects of the disclosure provide a user equipment (UE). The UE can include circuitry configured to associate logical channels each with a first numerology indicating an allowed subcarrier spacing for transmission of data units in the respective logical channel in a wireless communication system, and multiplex data units of a subset of the logical channels into a transport block associated with a second numerology, the subset of the logical channels each having a first numerology that is the same as the second numerology.

Aspects of the disclosure provide a non-transitory computer readable medium storing instructions the implements the method.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows examples of numerologies in a table according to an embodiment of the disclosure;

DETAILED DESCRIPTION

Figure 1:
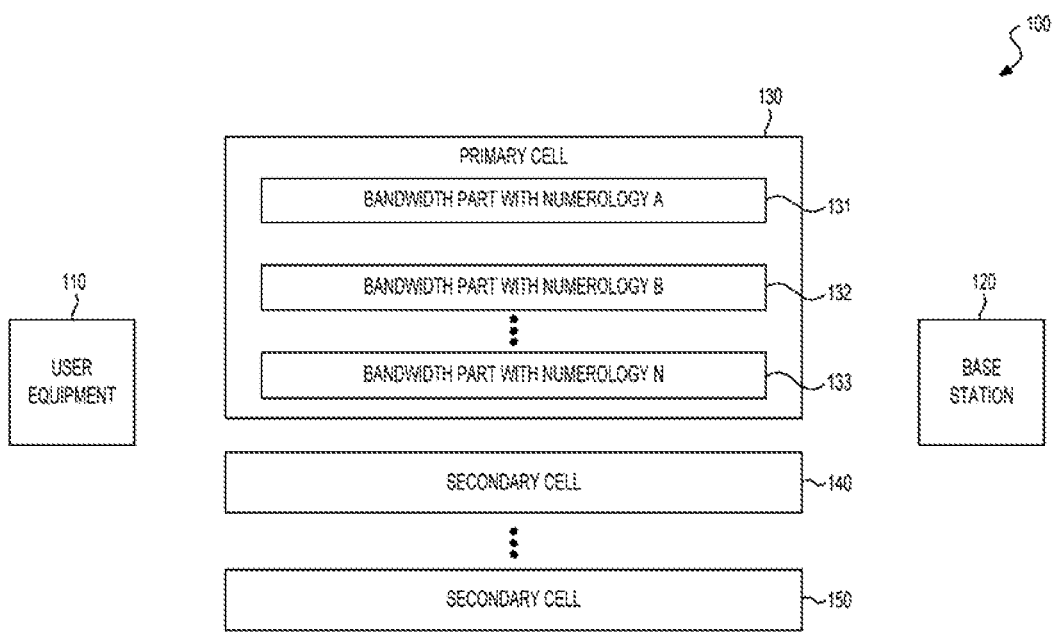
FIG. 1 shows a wireless communication system according to an embodiment of the disclosure.

FIG. 1 shows a wireless communication system 100 according to an embodiment of the disclosure. The system 100 can include a user equipment (UE) 110 and a base station (BS) 120. The system 100 can be a cellular network, and employ the New Radio (NR) technologies and the LTE technologies developed by the 3rd Generation Partnership Project (3GPP) for wireless communications between the UE 110 and the BS 120. The UE 110 can be a mobile phone, a laptop computer, a device carried in a vehicle, and the like. The BS 120 can be an implementation of a gNB specified in NR standards. Accordingly, the UE 110 can communicate with the base station 120 through a wireless communication channel according to communication protocols specified in respective communication standards. Please note that the invention is not limited by this.

In one example, the UE 110 and the base station 120 are configured to employ carrier aggregation techniques to communicate with each other. Accordingly, multiple serving cells 130-150 can be configured between the UE 110 and the base station 120. Each of the multiple serving cells 130-150 can correspond to a downlink component carrier, and an uplink component carrier. Alternatively, a serving cell can be configured asymmetrically, and only an uplink component carrier or a downlink component carrier is transmitted on the respective serving cell. The uplink component carriers can be transmitted in parallel allowing for an overall wider uplink bandwidth and correspondingly higher uplink data rates. Similarly, the downlink component carriers can be transmitted in parallel allowing for an overall wider downlink bandwidth and correspondingly higher downlink data rates. Different serving cells can operate in frequency division duplex (FDD) mode or time division duplex (TDD) mode. For serving cells configured with TDD mode, different uplink-downlink configurations can be used for different component carriers.

The multiple serving cells 130-150 can include a primary cell (PCell) 130 and secondary cells (SCells) 140-150. The PCell 130 can be established first, for example, after an initial access procedure, and the SCells 140-150 can be subsequently configured and added through signaling on the PCell 130. Depending on capability of the UE 110, different number of serving cells can be configured. The system 100 can include other UEs (not shown in FIG. 1) that may or may not be configured with aggregated carriers. The serving cells 130-150 can be shared between the UE 110 and other UEs in the system 100.

In one example, the component carrier(s) of the PCell 130 can be partitioned into multiple bandwidth parts. For example, the PCell 130 can operate in TDD mode with a large bandwidth, for example, 100 MHz. The component carrier can be partitioned into a plurality of bandwidth parts 131-133 each having a smaller bandwidth. In this way, a UE can operate on a bandwidth part with a smaller bandwidth. Similarly, assuming the PCell 130 operates in FDD mode, the uplink and downlink component carriers of the PCell 130 can be partitioned into a plurality of bandwidth parts with smaller bandwidths. UE performs RF adaptation through either center frequency tuning or bandwidth adaptation or both of them on a wideband carrier. It enables reduced UE bandwidth capability within a wideband carrier, reduced UE power energy consumption by bandwidth adaptation and UE using different numerologies in FDM within a wideband carrier.

In addition, in one example, the component carrier(s) can support multiple numerologies. For example, the bandwidth parts 131-133 can each be configured with a numerology, such as a numerology A configured for the bandwidth part 131, a numerology B configured for the bandwidth part 132, or a numerology N configured for the bandwidth part 133. The numerologies configured for different bandwidth parts 131-133 can be the same or different from each other. Accordingly, a bandwidth part can be specified with a number of physical resource blocks (PRBs) in the frequency domain, a frequency location (e.g., center frequency), and a numerology in one example.

In one example, the UE 110 can be configured to support multiple bandwidth parts and multiple numerologies in an uplink or downlink between the UE 110 and the BS 120. For example, the UE 110 can operate on the bandwidth parts 131-133 configured with the numerologies A-N. In alternative examples, a UE of the system 100 may only support one or a portion of the bandwidth parts 131-133 due to capability of this UE.

Similarly, in FIG. 1 example, the component carriers of the Scells 140-150 can each be partitioned into multiple bandwidth parts and each bandwidth part is configured with a numerology. In alternative examples, part or all of the component carriers (such as the component carriers of the Pcell 130 and Scells 140-150) are not partitioned, and a whole bandwidth of each of those un-partitioned component carriers is used as one bandwidth part, and configured with a numerology. In some examples, partition of a component carrier can change dynamically.

FIG. 2 shows examples of numerologies in a table 200 according to an embodiment of the disclosure. In an example, a family of orthogonal frequency division multiplexing (OFDM) numerologies can be defined using a scalable approach. Specifically, a numerology can be specified by a subcarrier spacing (a width of a subcarrier in the frequency domain). A based subcarrier spacing of 15 KHz can be first defined. Other subcarrier spacing can be defined with respect to the base subcarrier spacing with a scaling factor $2^m$ with m belonging to $\{0, 1, \ldots, 5\}$. In one example, a numerology is defined by at least one of a set of parameters. The set of parameters can include a subcarrier spacing specifying the numerology, a cyclic prefix (CP) length, a frame structure, a transmission time interval (TTI), or other additional parameters. For example, a CP length can be normal CP length or an extended CP length. A frame structure can define a number of slots in a subframe and a number of OFDM symbols in a slot. In various examples, a set of parameters defining a numerology can be different and may include different parameters. In one example, the numerology is defined only using subcarrier spacing.

As shown in the table 200, each column 201-206 includes a set of parameters defining a respective numerology. As an example, the numerology corresponding to the column 201 has the base subcarrier spacing of 15 KHz, an OFDM symbol duration of 66.67 μs which is inverse to the base subcarrier spacing, a CP length of 4687 ns. Each set of parameters in each column may include other parameters that are not shown in the table 200.

In one example, each numerology is associated with a numerology index as shown in the last row 210 of the table 200. Associations between the numerologies and the numerology indexes can be specified in a communication standards. Alternatively, the associations between the numerologies and the numerology indexes can be semantically defined through system information broadcasted from the BS 120 to the UE 110. Or, the associations between the numerologies and the numerology indexes can be defined dynamically by radio resource control (RRC) messages transmitted from the BS 120 to the UE 110.

The numerology indexes can be used for signaling numerology related configurations between the UE 110 and the BS 120. For example, the numerology indexes can be used to signal bandwidth part numerology configurations of a component carrier from the BS 120 to the UE 110 with an RRC message in one example. In another example, a numerology index can be included in a field of a downlink control information (DCI) format to indicate a numerology associated with a uplink resource grant.

Figure 3:
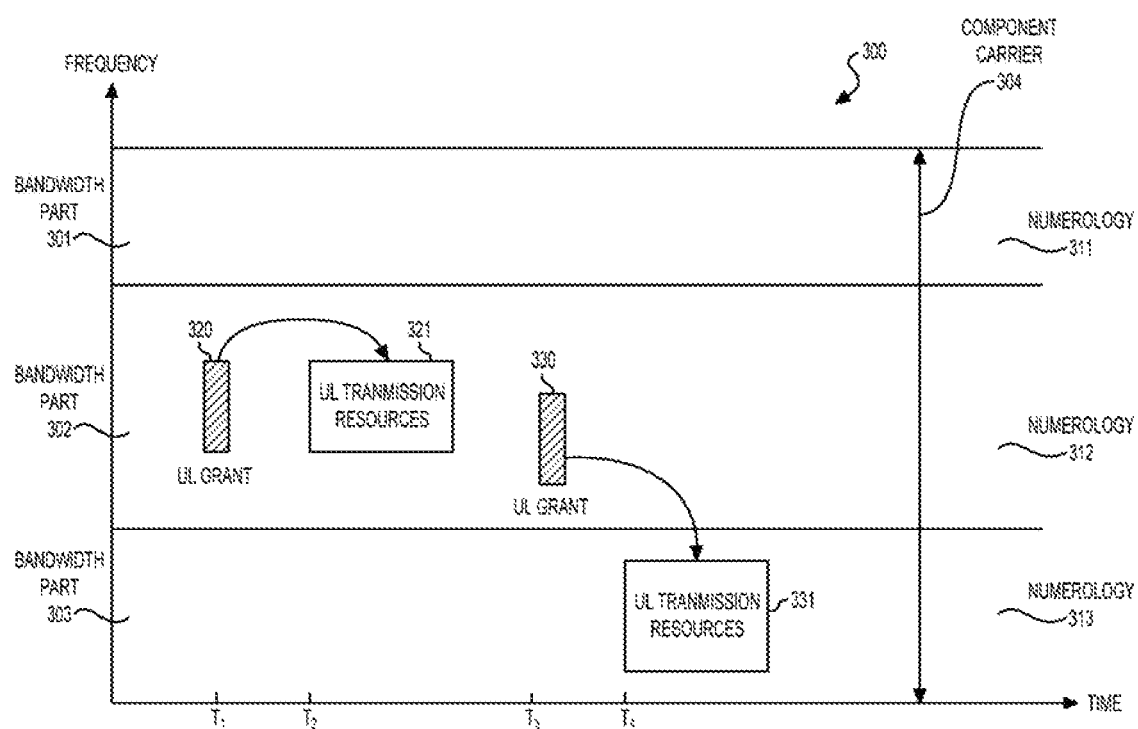
FIG. 3 shows an example of partitioning a component carrier into multiple bandwidth parts, and an uplink resource allocation and transmission process according to an embodiment of the disclosure.

FIG. 3 shows an example of partitioning a component carrier 304 into multiple bandwidth parts 301-303 according to an embodiment of the disclosure. As shown, the bandwidth parts 301-303 are each configured with a numerology 311-313. The numerologies 311-313 can be the same or different.

The bandwidth partition can be configured semi-statically. For example, the component carrier 304 can be the component carrier of the Pcell 130 in FIG. 1 example and operate in TDD mode. A bandwidth partition configuration for the component carrier can be included in system information that can be received at the UE 110 from the BS 120 during an initial access process. Alternatively, the bandwidth partition can be configured dynamically. For example, an RRC message can be transmitted from the BS 120 to the UE 110 indicating a change of the bandwidth partition configuration. In other examples, other signaling methods may be employed, for example, including usage of media access control (MAC) layer control elements, a dedicated physical downlink control channel, and the like.

When the bandwidth partition is being configured, a bandwidth part configuration for a bandwidth part may specify a numerology for the respective bandwidth part. For example, configurations of the bandwidth parts 301-303 may specify that each bandwidth part 301-303 is associated with a numerology 311-313, respectively. In some example, numerology indexes may be used in the bandwidth part configurations.

FIG. 3 also shows an uplink resource allocation and transmission process 300 according to an embodiment of the disclosure. Specifically, at a first step, a first uplink resource grant 320 can be received at the UE 110 at time T1. For example, the uplink resource grant 320 can be carried in a physical downlink control channel (PDCCH) indicating a block of uplink transmission resources 321 assigned for an uplink transmission of the UE 120. The block of uplink transmission resources 321 can be carried in the same bandwidth part 302 as the uplink resource grant 320. At a second step, the uplink transmission can be performed using the uplink transmission resources 321.

At a third step, a second uplink resource grant 330 indicating a block of uplink transmission resources 331 can be received at time T3. However, different from the scenario of the first uplink resource grant 320, the second uplink resource grant 330 and the corresponding block of uplink transmission resources 331 are carried in different bandwidth parts. At a fourth step, an uplink transmission can be performed using the uplink transmission resources 331. For example, the UE 110 may switch operating frequency of a radio frequency (RF) module from the bandwidth part 302 to the bandwidth part 303.

In various examples, a numerology corresponding to an uplink transmission can be determined in several different ways. In a first example, an uplink transmission numerology can be determined according to numerology information included in an uplink resource grant. For example, the uplink resource grant 320 or 330 can explicitly specify a numerology associated with the respective uplink transmission resources 321 or 331. For example, a DCI format indicating the uplink resource grant 320 or 330 may include a field, for example, including a numerology index of the respective numerology.

In a second example, the UE 110 can derive a numerology associated with a block of uplink transmission resources. For example, the uplink resource grant 320 or 330 may not carry numerology information directly. However, the UE 110 can know a location of a block of uplink transmission resources 321 or 331 in frequency domain based on the respective uplink resource grant 320 or 330 that specifies, for example, a starting subcarrier of the respective transmission resources. The UE 110 is aware of bandwidth part configurations in advance and has knowledge of numerologies of each bandwidth parts 301-303. Accordingly, a numerology corresponding to a respective uplink transmission resources can be determined.

In a third example, uplink transmission resources may be scheduled in a semi-persistent manner to reduce control signaling overhead. For example, a semi-persistent uplink resource scheduling configuration specifying a sequence of uplink transmission resource blocks during a time interval can be signaled from the BS 120 and the UE 110, for example, by an RRC message. Based on this resource scheduling configuration, a numerology corresponding to a block of uplink transmission resources can be known by the UE 110.

Figure 4:
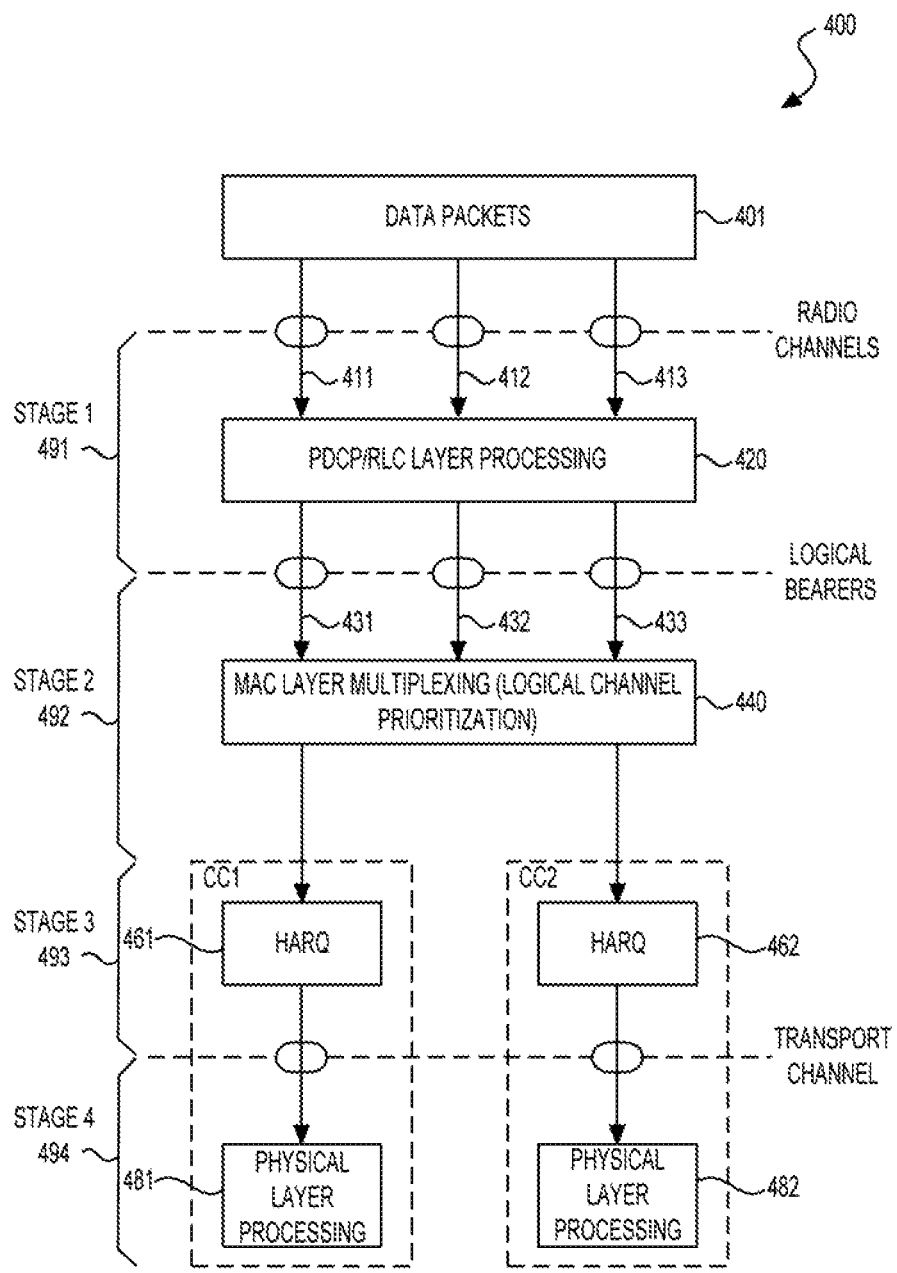
FIG. 4 shows an example process for uplink transmission processing with multiple numerologies according to some embodiments of the disclosure.

FIG. 4 shows an example process 400 for uplink transmission processing with multiple numerologies according to some embodiments of the disclosure. The process 400 can be performed at the UE 110. The process 400 can include four stages 491-494.

At the first stage 491, data packets 401 generated from multiple applications in the UE 110 can be received at multiple radio bearers 411-413, and processed by packet data convergence protocol (PDCP) layer and radio link control (RLC) layer processing 420. Resultant data units from the PDCP/RLC layer processing 420 are then received at logical channels 431-433.

During the first stage 491, each bearer 411-413 and corresponding logical channels 431-433 can be associated with one or more numerologies. Thus, a bearer or a logical channel, when associated with a numerology, is allowed for transmission on a bandwidth part configured with the associated numerology. For example, an application may initiate a request for transmitting data packets. As a response, a radio bearer between the UE 110 and the BS 120 can be set up for the respective application, for example, by exchanging RRC messages between the UE 110 and the BS 120. Each of the radio bearers 411-413 can be associated with one or more numerologies according to service requirements of the respective application when the radio bearer is set up.

For example, a first application can be latency sensitive (e.g., drone control, gaming, etc.), and may require a short TTI duration such that a small round trip delay can be obtained. Accordingly, data packets can be transmitted on a bandwidth part configured with a numerology having a short TTI duration, and the numerology (e.g., a numerology index) can be associated with a radio bearer established for the first application, and a corresponding logical channel.

A second application can be a video streaming application that may require a high data rate, and accordingly may prefer a combination of multiple bandwidth parts. Thus, multiple numerologies associated with the multiple bandwidth parts may be associated with a same radio bearer established for the second application and a corresponding logical channel. A third application can be a phone call application and require a bandwidth part configured with a base numerology.

Accordingly, the base numerology can be associated with a radio bearer established for the third application and a corresponding logical channel.

In addition, each logical channels 431-433 can be associated with a set of logical channel prioritization (LCP) parameters determined according to a quality of service (QoS) level assigned to the respective application. For example, based on the LCP parameters, different logical channels can be treated differently according to the corresponding QoS level.

At the second stage 492, the data units received at the logical channels 431-433 are multiplexed into a transport block by performing a MAC layer multiplexing process 440 (also referred to as an LCP process 440). The transport block can then be transmitted to one of two hybrid automatic repeat request (HARQ) entities 461-462. The transport block can correspond to a block of uplink transmission resources specified by an uplink resource grant received from the BS 120. The size of the transport block can be determined according to the uplink resource grant received from the BS 120.

Particularly, the block of uplink transmission resources corresponding to the transport block can be carried in a bandwidth part that is configured with a numerology. Thus, the transport block can be associated with this numerology. During the MAC layer multiplexing process 440, logical channels associated with a numerology that is the same as that of the transport block are multiplexed into the transport block. In contrast, logical channels that do not have an associated numerology that is the same as the numerology of the transport block will not be processed.

In addition, after the logical channels having the same associated numerology as the transport block are identified, spaces in the transport block are allocated to those identified logical channels in a way that satisfies QoS requirements of those identified logical channels. The allocation can be performed based on the LCP parameters assigned to each identified logical channel. For example, the LCP parameters can include a priority value and a set of rate control parameters. The rate control parameters, for example, can be determined by the BS 120 and signaled to UE 110. In one example, the rate control parameters of a logical channel include a prioritized bit rate (PBR). The PBR can specify a minimum bit rate required by a respective QoS level of a respective logical channel.

At the third stage 493, HARQ transmission is performed. In FIG. 4 example, two component carriers CC1 and CC2 are aggregated at the UE 110. Accordingly, HARQ transmission or retransmission and physical layer processing are performed separately for each of the two component carriers CC1 and CC2 in one example. Depending on which component carrier, CC1 or CC2, the uplink transmission resources for the transport block are carried on, the transport block generated from the MAC layer multiplexing process 440 can be transmitted to one of the HARQ entities 461-462.

In the FIG. 4 example, each component carrier is configured with one HARQ entity. Each component carrier can be partitioned into multiple bandwidth parts. Accordingly, each HARQ entity 461 or 462 can be configured to handle transmission or retransmission over multiple bandwidth parts. For example, the HARQ entity 461 can operate multiple HARQ processes. The multiple HARQ processes can each be associated with a process number identifying a respective HARQ process. During operation, the multiple HARQ processes can be sequentially used to transmit transport blocks over a same or different bandwidth parts.

When transmitting a transport block during a TTI, a process number of an HARQ process transmitting the transport block can be transmitted during the same TTI. For example, the process number can be carried in a physical uplink shared channel (PUSCH) that carries the transport block. In this way, the BS 120 can know which HARQ process the received transport block is sent from. Subsequently, the BS 120 can feedback a positive acknowledgement (ACK) or a negative ACK (NACK). In one example, the feedback of an ACK or NACK can take place at a fixed time point with respect to a time for transmitting the respective transport block. Thus, the HARQ entity 461 can know which HARQ process the feedback is intended for.

When a NACK is received for an HARQ process, this HARQ process can hold data of a previously transmitted transport block, and stop its operations for transmitting a new transport block. Later, the BS 120 can transmit an uplink resource grant, for example, carried in a PDCCH, for retransmission of the held transport block. The uplink resource grant may include a process number of this HARQ process such that a retransmission request can be directed to this HARQ process.

As multiple bandwidth parts can be used dynamically and switching between the multiple bandwidth parts may take place from time to time, a feedback of ACK or NACK for an uplink transmission may be carried in a bandwidth part that is different from a bandwidth part that carries this uplink transmission. Similarly, an uplink resource grant for retransmission of a transport block may be carried in a bandwidth part that is different from a bandwidth part carrying the retransmitted transport block. The HARQ entity 462 can operate in a way similar to the entity 461.

In alternative examples, each bandwidth part in a component carrier CC1 or CC2 can be configured with an HARQ entity. Accordingly, multiple HARQ entities can be used to handle transmissions over different bandwidth parts carried in one component carrier. In this scenario, each HARQ entity can operate in a similar way as the HARQ entity 461.

At the fourth stage 494, the transport block transmitted from one of the HARQ entities 461 or 462 can be processed with physical layer processing 481 or 482. Particularly, the transport block can be processed according to the numerology associated with the transport block. For example, a physical layer entity may adjust respective parameters for IFFT operations and perform OFDM modulation according to the numerology. As a result, the transport block can be mapped to the block of uplink transmission resources carried in the respective bandwidth part, and transmitted to the BS 120.

Figures 5, 6:
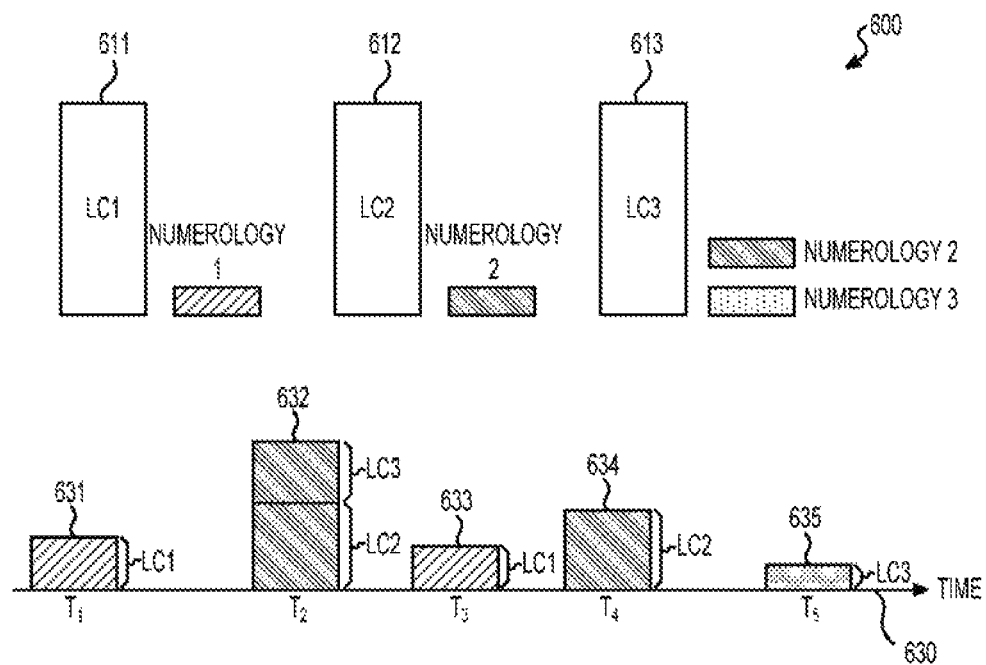
FIG. 5 shows a table including logical channels associated with different numerologies according to an embodiment of the disclosure.
FIG. 6 shows an example of a media access control (MAC) layer multiplexing process according to an embodiment of the disclosure.

FIG. 5 shows a table 500 including logical channels associated with different numerologies according to an embodiment of the disclosure. Three logical channels LC1-LC3 are listed in the first column 510 of the table 500. For example, the logical channels LC1-LC3 can be the logical channels 431-433 in FIG. 4 example. The logical channels LC1-LC3 can each be associated with a priority value indicating a priority order for LCP processing. For example, the priority order can be LC1>LC2>LC3. Three numerologies, numerology 1, numerology 2, and numerology 3, are shown in the first row 520 of the table 500. For example, the three numerologies can be the numerologies configured for bandwidth parts of the component carrier CC1 in FIG. 4 example.

As shown, the logical channel LC1 is associated with the numerology 1. Thus, the logical channel LC1 is allowed to be transmitted on a bandwidth part configured with the numerology 1. In other words, the logical channel LC1 is allowed to be multiplexed into a transport block that corresponds to a block of uplink transmission resource carried in a bandwidth part configured with the numerology 1. Accordingly, the logical channel LC1 is said to be allowed on the numerology 1. In addition, the logical channel LC1 is not allowed to be transmitted on a transport block or a bandwidth part associated with the numerology 2 or 3. Corresponding to this scenario, the logical channel LC1 is said to be not allowed on the numerology 2 or 3.

Similarly, the logical channel LC2 is associated with numerology 2 and is allowed to be transmitted on a bandwidth part configured with the numerology 2, or multiplexed into a transport block associated with the numerology 2. However, the logical channel LC2 is not allowed to be transmitted on a bandwidth part configured with the numerology 1 or 3. For the logical channel LC3, two numerologies, numerology 2 and numerology 3, are associated with the logical channel LC3. Accordingly, the logical channel LC3 is allowed to be transmitted on a bandwidth part configured with either numerology 2 or numerology 3. However, the logical channel LC3 is not allowed to be transmitted on a bandwidth part configured with the numerology 1.

FIG. 6 shows an example of a MAC layer multiplexing process 600 according to an embodiment of the disclosure. Three rectangles 611-613 are shown in FIG. 6 each representing a logical channel buffer 611-633. The logical channel buffers 611-613 correspond to the three logical channels, LC1-LC3, described in FIG. 5 example. The associations between the three logical channels LC1-LC3 and the numerology 1, 2, or 3 (as shown in the table 500) are also illustrated in FIG. 6. Specifically, the three numerologies are represented by different patterns.

A sequence of transport blocks 631-635 are shown along a time axis 630. Each of the transport blocks 631-635 can be processed and transmitted around one of five time instants from T1 to T5. Each transport block 631-635 can have a different size. Particularly, each transport block 631-635 can be associated with a numerology. As shown, the transport blocks 631 and 633 are associated with the numerology 1. The transport blocks 632 and 634 are associated with the numerology 2, and the transport block 635 is associated with the numerology 3.

During the MAC layer multiplexing process 600, data units contained in the logical channel buffers 611-613 are multiplexed into one transport block at each of the time instants T1-T5. Particularly, for a transport block being processed, logical channels having a same associated numerology as the currently being processed transport block are identified and processed, while logical channels that are not allowed to be transmitted on the numerology of the currently being processed transport blocks are not processed or multiplexed.

Specifically, at T1, the transport block 631 is being processed. As the transport block 631 is associated with the numerology 1, and only the logical channel LC1 is allowed on numerology 1, data units contained in the logical channel buffer 611 are filled into to the transport block 631 and transmitted subsequently.

At T2, the transport block 632 is being processed. The transport block 632 is associated with the numerology 2. As the logical channels LC2 and LC3 are allowed on the numerology 2, data units in the logical channel buffers 612 and 613 are multiplexed into the transport block 632. Specifically, a LCP algorithm can be employed to perform a LCP process for multiplexing the logical channels LC2 and LC3. In one example LCP algorithm, the logical channels are processed according to their priority. At the same time, a prioritized bit rate (PBR) is used to control allocation of transport block spacing to avoid starvation of a low priority logical channel.

At T3, the transport channel 633 is associated with the numerology 1, and accordingly data units in the logical channel buffer 611 are filled in the transport block. At T4, the transport block 634 is associated with the numerology 2, and accordingly, the logical channels LC2 and LC3 are identified to be allowed for transmission. The LCP process can be performed with data units in the logical channel buffers 612, and 613. For example, spacing of the transport channel 634 are occupied by data units of the logical channel LC2 that has a higher priority than the logical channel LC3, and no room is left for the logical channel LC3. At T5, the transport block 635 is associated with the numerology 3. Data units in the logical channel buffer 613 are filled into the transport block 635 as only the logical channel LC3 is allowed on the numerology 3.

Figure 7:
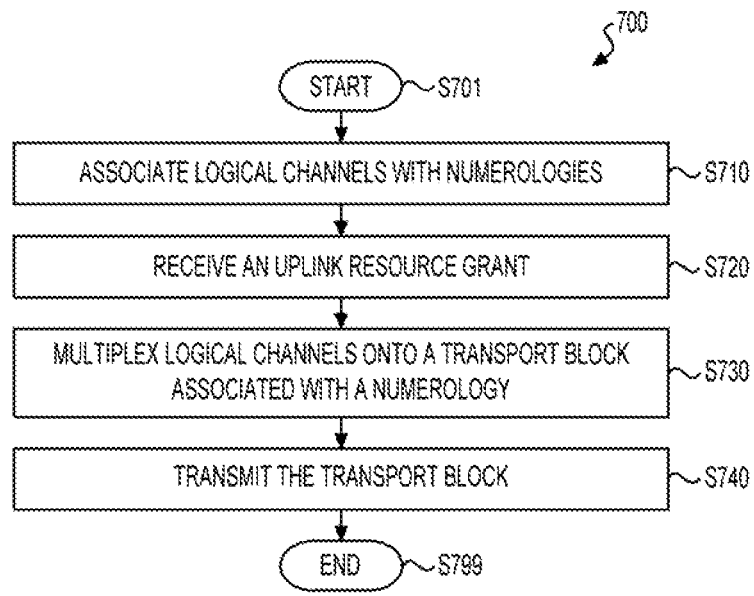
FIG. 7 shows an example process for uplink transmission processing with multiple numerologies according to an embodiment of the disclosure.

FIG. 7 shows an example process 700 for uplink transmission processing with multiple numerologies according to an embodiment of the disclosure. The process 700 can be performed at the UE 110 for transmission of data packets to the BS 120. The process 700 can start from S701 and proceed to S710.

At S710, a set of logical channels can be associated with one or more numerologies. For example, an application in the UE 110 can initiate a transmission of data packets. As a response, a radio bearer can be established, and one or more numerologies can be associated with the radio bearer according to service requirements of the application. A logical channel carrying data units of the radio bearer can accordingly be associated with the one or more numerologies associated with the radio bearer. When a numerology is associated with the logical channel, the logical channel is allowed on this numerology. In other words, the logical channel is allowed to transmit data units on a transport block or a bandwidth part associated with this numerology.

At S720, an uplink resource grant can be received at the UE 110 from the BS 120. For example, the uplink resource grant can indicate a block of transmission resources carried on a bandwidth part that is configured with a numerology. Accordingly, a transport block corresponding to this uplink resource grant can be associated with the numerology configured for the bandwidth part.

At S730, the logical channels can be multiplexed onto the transport block corresponding to the uplink resource grant received at S720. Particularly, logical channels having an associated numerology the same as the numerology of the transport block can be identified and multiplexed. An LCP process can be processed for multiplexing data units of the respective logical channels. Logical channels that are not allowed on the numerology of the transport block are not processed.

At S740, the transport block generated at S730 as a result of the multiplexing operation can be transmitted. For example, a HARQ entity can be employed to transmit the transport block via the bandwidth part indicated by or derived from the uplink resource grant. A physical entity can be employed to perform physical layer processing to process the transport block and generate wireless signals carrying the transport block. The process 700 can proceed to S799 and terminates at S799.

Figure 8:
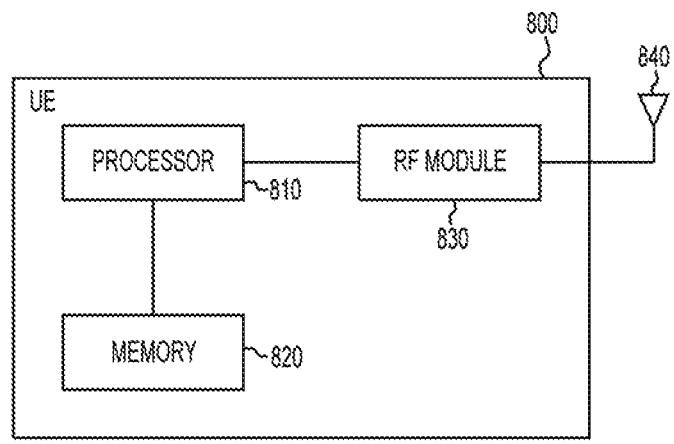
FIG. 8 shows an exemplary block diagram of a user equipment (UE) according to an embodiment of the disclosure.

FIG. 8 shows an exemplary block diagram of a UE 800 according to an embodiment of the disclosure. The UE 800 can be configured to implement various embodiments of the disclosure described herein. The UE 800 can include a processor 810, a memory 820, and a radio frequency (RF) module 830 that are coupled together as shown in FIG. 8. In different examples, the UE 800 can be a mobile phone, a tablet computer, a desktop computer, a vehicle carried device, and the like.

The processor 810 can be configured to perform various functions of the UE 110 described above with reference to FIGS. 1-7. The processor 810 can include signal processing circuitry to process received or to be transmitted data according to communication protocols specified in, for example, LTE and NR standards. Additionally, the processor 810 may execute program instructions, for example, stored in the memory 820, to perform functions related with different communication protocols. The processor 810 can be implemented with suitable hardware, software, or a combination thereof. For example, the processor 810 can be implemented with application specific integrated circuits (ASIC), field programmable gate arrays (FPGA), and the like, that includes circuitry. The circuitry can be configured to perform various functions of the processor 810.

In one example, the memory 820 can store program instructions that, when executed by the processor 810, cause the processor 810 to perform various functions as described herein. The memory 820 can include a read only memory (ROM), a random access memory (RAM), a flash memory, a solid state memory, a hard disk drive, and the like.

The RF module 830 can be configured to receive a digital signal from the processor 810 and accordingly transmit a signal to a base station in a wireless communication network via an antenna 840. In addition, the RF module 830 can be configured to receive a wireless signal from a base station and accordingly generate a digital signal which is provided to the processor 810. The RF module 830 can include digital to analog/analog to digital converters (DAC/ADC), frequency down/up converters, filters, and amplifiers for reception and transmission operations. For example, the RF module 830 can include converter circuits, filter circuits, amplification circuits, and the like, for processing signals on different carriers or bandwidth parts.

The UE 800 can optionally include other components, such as input and output devices, additional CPU or signal processing circuitry, and the like. Accordingly, the UE 800 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
    associating each one of logical channels in a wireless communication system with one or more corresponding numerologies from a plurality of numerologies, each numerology of the plurality of numerologies being associated with a respective subcarrier spacing for transmission;
    receiving an uplink resource grant specifying transmission resources associated with an uplink transmission numerology;
    multiplexing data units of a subset of the logical channels into a transport block corresponding to the uplink resource grant, the subset of the logical channels each having an associated numerology that is the same as the uplink transmission numerology; and
    transmitting the transport block based on the transmission resources specified by the uplink resource grant.

2. The method of claim 1, further comprising:
    receiving a signaling message that includes the uplink resource grant.

3. The method of claim 2, wherein the resource grant includes an indicator indicating the uplink transmission numerology.

4. The method of claim 2, further comprising:
    determining the uplink transmission numerology according to the transmission resources.

5. The method of claim 1, further comprising:
    deriving the uplink transmission numerology according to a semi-persistent uplink transmission resource scheduling configuration specifying blocks of uplink transmission resources on one or more bandwidth parts each configured with a respective numerology.

6. The method of claim 1, further comprising:
    receiving numerology configurations of a component carrier that is partitioned into multiple bandwidth parts each configured with a respective numerology,
    wherein the transport block corresponds to a block of uplink transmission resources carried in one of the multiple bandwidth parts that is associated with the uplink transmission numerology.

7. The method of claim 1, wherein the numerologies associated with the logical channels or the uplink transmission numerology are each identified by a numerology index.

8. The method of claim 7, wherein an association between one of the numerologies associated with the logical channels or the uplink transmission numerology and a corresponding numerology index is specified in a communication standard, or configured by system information or a radio resource control (RRC) message received from a base station.

9. The method of claim 1, wherein the transmitting the transport block comprises:
   transmitting the transport block with a hybrid automatic repeat request (HARQ) entity that is one of multiple HARQ entities each corresponding to a bandwidth part of a component carrier.

10. The method of claim 1, wherein the transmitting the transport block comprises:
    transmitting the transport block with a hybrid automatic repeat request (HARQ) entity operating on multiple bandwidth parts of a component carrier.

11. A user equipment (UE), comprising circuitry configured to:
    associate each one of logical channels in a wireless communication system with one or more corresponding numerologies from a plurality of numerologies, each numerology of the plurality of numerologies being associated with a respective subcarrier spacing for transmission;
    receive an uplink resource grant specifying transmission resources associated with an uplink transmission numerology;
    multiplex data units of a subset of the logical channels into a transport block corresponding to the uplink resource grant, the subset of the logical channels each having an associated numerology that is the same as the uplink transmission numerology; and
    transmit the transport block based on the transmission resources specified by the uplink resource grant.

12. The UE of claim 11, wherein the circuitry is further configured to:
    receive a signaling message that includes the uplink resource grant.

13. The UE of claim 12, wherein the resource grant includes an indicator indicating the uplink transmission numerology.

14. The UE of claim 12, wherein the circuitry is further configured to:
    determine the uplink transmission numerology according to the transmission resources.

15. The UE of claim 11, wherein the circuitry is further configured to:
    derive the uplink transmission numerology according to a semi-persistent uplink transmission resource scheduling configuration specifying blocks of uplink transmission resources on one or more bandwidth parts each configured with a respective numerology.

16. The UE of claim 11, wherein the circuitry is further configured to:
    receive numerology configurations of a component carrier that is partitioned into multiple bandwidth parts each configured with a respective numerology,
    wherein the transport block corresponds to a block of uplink transmission resources carried in one of the multiple bandwidth parts that is associated with the uplink transmission numerology.

17. The UE of claim 11, wherein the numerologies associated with the logical channels or the uplink transmission numerology are each identified by a numerology index.

18. The UE of claim 11, wherein the circuitry is further configured to:
    transmit the transport block with a hybrid automatic repeat request (HARQ) entity that is one of multiple HARQ entities each corresponding to a bandwidth part of a component carrier.

19. The UE of claim 11, wherein the circuitry is further configured to:
    transmit the transport block with a hybrid automatic repeat request (HARQ) entity operating on multiple bandwidth parts of a component carrier.

20. A non-transitory computer readable medium storing instructions which, when executed by a processor, cause the processor to perform a method, the method comprising:
    associating each one of logical channels in a wireless communication system with one or more corresponding numerologies from a plurality of numerologies, each numerology of the plurality of numerologies being associated with a respective subcarrier spacing for transmission;
    receiving an uplink resource grant specifying transmission resources associated with an uplink transmission numerology;
    multiplexing data units of a subset of the logical channels into a transport block corresponding to the uplink resource grant, the subset of the logical channels each having an associated numerology that is the same as the uplink transmission numerology;
    transmitting the transport block based on the transmission resources specified by the uplink resource grant.

* * * * *